United States Patent [19]
Fridley et al.

[11] 3,796,031
[45] Mar. 12, 1974

[54] TREE SHAKER

[75] Inventors: Robert B. Fridley; James J. Mehlschau, both of Davis, Calif.

[73] Assignee: The Regents of the University of California, Berkeley, Calif.

[22] Filed: Nov. 15, 1972

[21] Appl. No.: 306,744

[52] U.S. Cl. .............................................. 56/328 TS
[51] Int. Cl. ............................................ A01g 19/00
[58] Field of Search ............ 56/328 R, 328 TS, 329; 248/13; 52/114

[56] References Cited
UNITED STATES PATENTS

| | | | |
|---|---|---|---|
| 3,579,970 | 5/1971 | Gilbert | 56/328 TS |
| 3,491,520 | 1/1970 | Watson | 56/328 TS |
| 3,537,246 | 11/1970 | Pool et al. | 56/328 TS |
| 3,059,402 | 10/1962 | Shipley, Sr. | 56/328 TS |

Primary Examiner—Louis G. Mancene
Assistant Examiner—J. N. Eskovitz
Attorney, Agent, or Firm—Lothrop and West

[57] ABSTRACT

A tree shaker has a carriage for movement in an orchard into a special position with respect to a tree to be shaken. On the carriage is a four-bar linkage supporting a platform for movement about the tree in an arcuate horizontal path with the platform directed toward the tree trunk and at various radial distances therefrom. The tree shaker unit is supported on and at selected heights above the platform by a torsion bar suspension having linkage so that the tree shaker unit is pendulous below the point of support on the platform. The tree shaker unit is driven with shaking strokes of various predetermined lengths by a crank pin moved at any time and locked in any of several positions at different radii from the rotational axis of the crank.

12 Claims, 10 Drawing Figures

TREE SHAKER

A device related to the present disclosure is shown in U.S. Pat. No. 3,545,190 issued Dec. 8, 1970 to Fridley et al.

In the increasing mechanization of many agricultural pursuits, particularly harvesting, there has been a substantially continuous attempt to provide a mechanical tree shaker that will be effective in dislodging olives from olive trees. The utilization of tree shakers in general with peaches and comparable fruits has been commercially quite effective and successful but because of the willowy nature of the olive tree and because the attachment of the olive fruit to the tree is particularly tenacious, it has been difficult indeed to provide a satisfactory mechanism for this purpose.

In various experimental trials it has been determined that a number of factors that are not particularly important with trees of other kinds are of especial criticality in connection with olive trees. It has been determined that it is highly advisable to vary the frequency of shaking during harvest in different portions of the tree or even in different portions of orchards, depending somewhat on the nature of the olive crop to be harvested. It is also of considerable importance to be able almost instantaneously to vary the stroke of the shaking mechanism in accordance with various different picking conditions of the olives. Difficulties have been had in attaching the shaking structure to the olive limbs to make sure that the attachment is perpendicular to the limb to avoid injury to the limb yet to impart accurately the selected stroke and the selected frequency of shaking. Also, because of the growth habit of olive trees, especially those that have not been particularly trained over a period of years for shaker harvesting, the operator has some difficulty in working the shaking mechanism in and about the tree.

It is therefore an object of the invention to provide a tree shaker which is particularly adapted for use in harvesting olives.

Another object of the invention is to provide a tree shaker which is generally an improvement over tree shakers available heretofore.

A further object of the invention is to provide a tree shaker in which the frequency of shaking and the length of stroke of shaking can be varied readily and easily from time to time.

Another object of the invention is to provide a tree shaker in which the operator can maneuver the shaking mechanism around and beneath a tree with great facility.

A further object of the invention is to maintain a tree shaker unit axis in a desired orientation relative to its suspension to facilitate vibration isolation.

A further object of the invention is to provide a tree shaker in which the shaking mechanism is movable in a generally arcuate path around a portion of the tree with the mounting of the shaking mechanism disposable in a direction nominally pointed toward the tree trunk.

A further object of the invention is to provide a tree shaker in which the operator can maneuver the shaker readily into a favorable location for acceptable operation, particularly to dislodge olives.

Other objects, together with the foregoing, are attained in the embodiment of the invention described in the accompanying description and illustrated in the accompanying drawings, in which:

Figure 1:
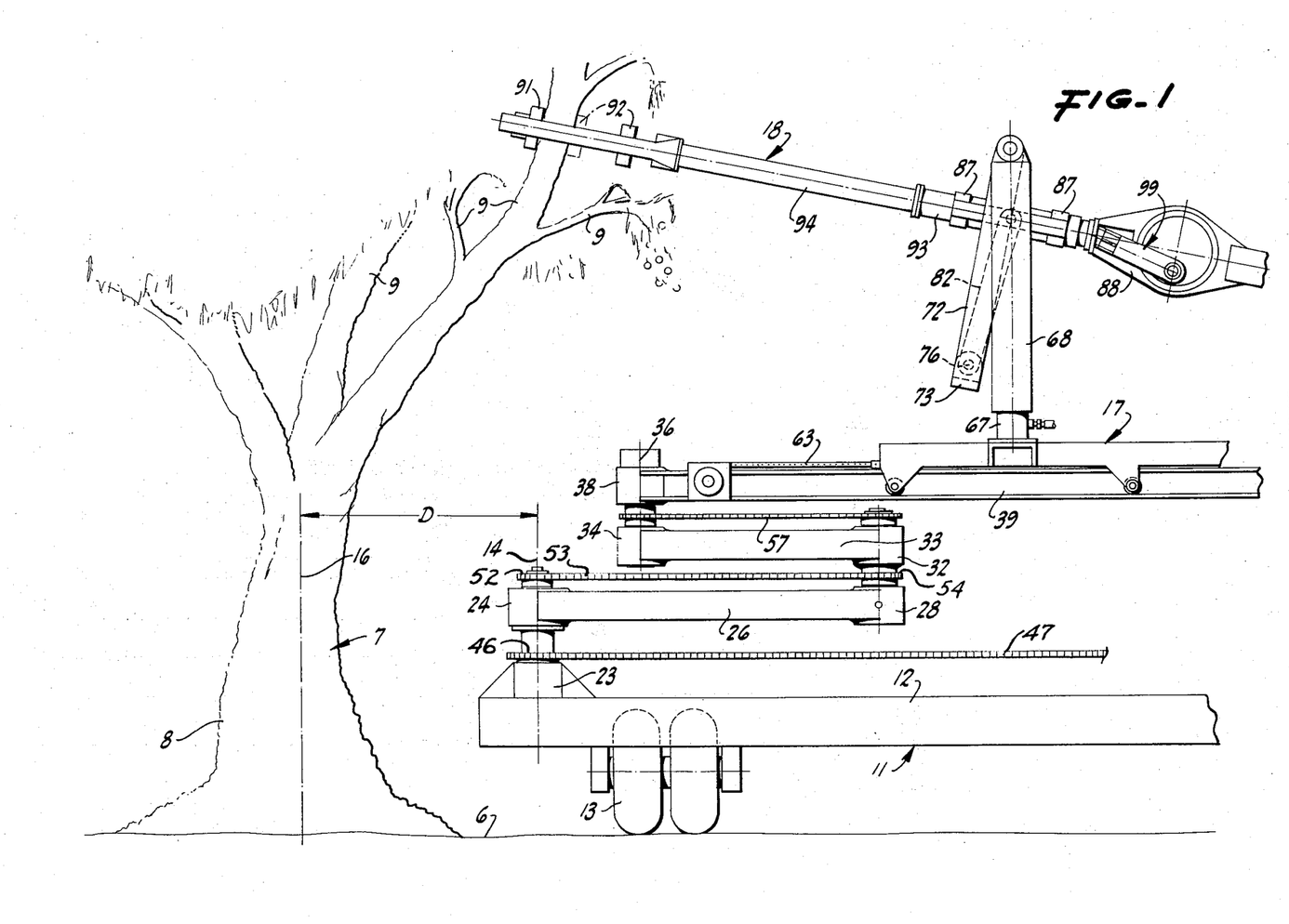
FIG. 1 is an end elevation of a tree shaker pursuant to the invention as it appears in an orchard, particularly an olive orchard, with certain portions of the mechanism being drawn to an exaggerated scale and certain parts of the mechanism being broken away to reduce the size of the figure.

In an exemplary environment the tree shaker of our invention is utilized on the ground 6 of an orchard in which trees 7, such as olive trees, are planted. These are usually in rows extending longitudinally. The tree 7 has a trunk portion 8 and various branches 9 on which the fruit occur. Since the tree rows are usually rectilinear there is provided a carriage 11 adapted to travel along the rows alongside the trees. The carriage includes a frame 12 and supporting wheels 13 which may be power driven and dirigible so that an operator, appropriately stationed, can advance the carriage on the ground 6 driving in a direction generally parallel to the tree rows. In moving the machine the carriage 11 is positioned for picking so that a vertical axis 14 thereon is maintained at approximately a predetermined or known minimum distance D from the arbitrary axis 16 of an individual tree.

The carriage 11 particularly serves as a support for an operator's platform 17 carrying a generally standard shaker unit 18. Special mechanism is afforded for locating the platform 17 with respect to the carriage 11. Particularly pursuant to the invention the vertical axis 14, which can be referred to as a first axis, is utilized as a datum or location point for a special four-bar linkage for relating the platform 17 to the carriage. For that reason there is provided on the carriage 11 a spindle 21 (see FIG. 2) that is coaxial with the axis 14. The spindle is provided with an anchor 22 in the nature of a keyed and tapered fit in a support boss 23 on the carriage 11.

Figures 2, 3:
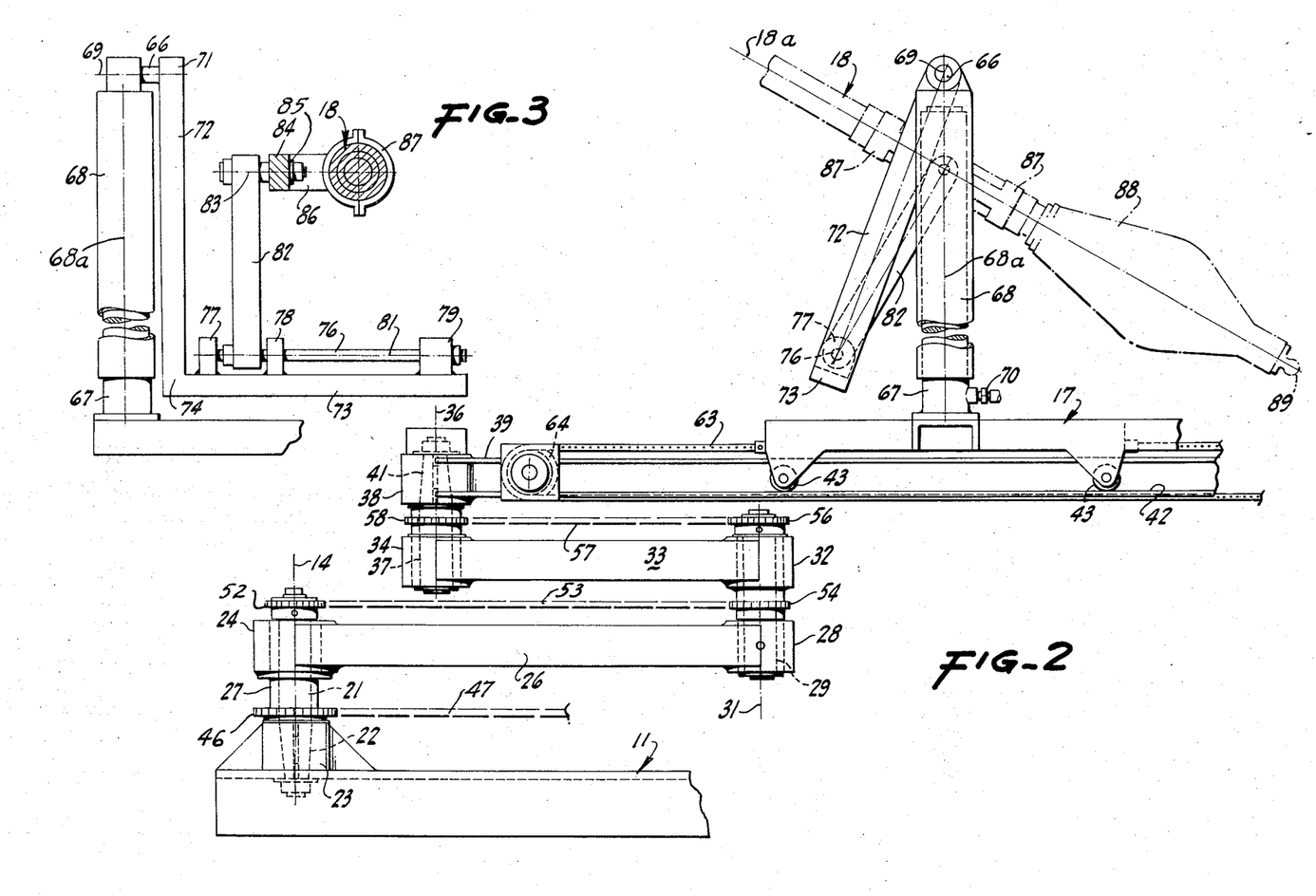
FIG. 2 is a fragmentary view similar to FIG. 1 but showing additional details of construction.
FIG. 3 is for the most part an elevation of some of the mounting structure, a portion of the shaker being shown in cross-section and a portion of the support being broken away to reduce its size.

The first spindle 21 is thus held against rotation on the carriage 11 and serves as a support mounting for one end 24 of a base beam 26. This end 24 is secured to a hub 27 also journalled on the spindle 21 so that the base beam 26 is rotatably supported about the first axis 14. The base beam 26 at its other end has a hub 28 fixed on one portion of a second spindle 29 concentric with a second axis 31 parallel to the first axis 14. The second spindle 29 also is extended to serve as a mounting for a hub 32 at one end of an intermediate beam 33 and journalled about the second spindle 29, also for rotation about the axis 31.

Figure 4:
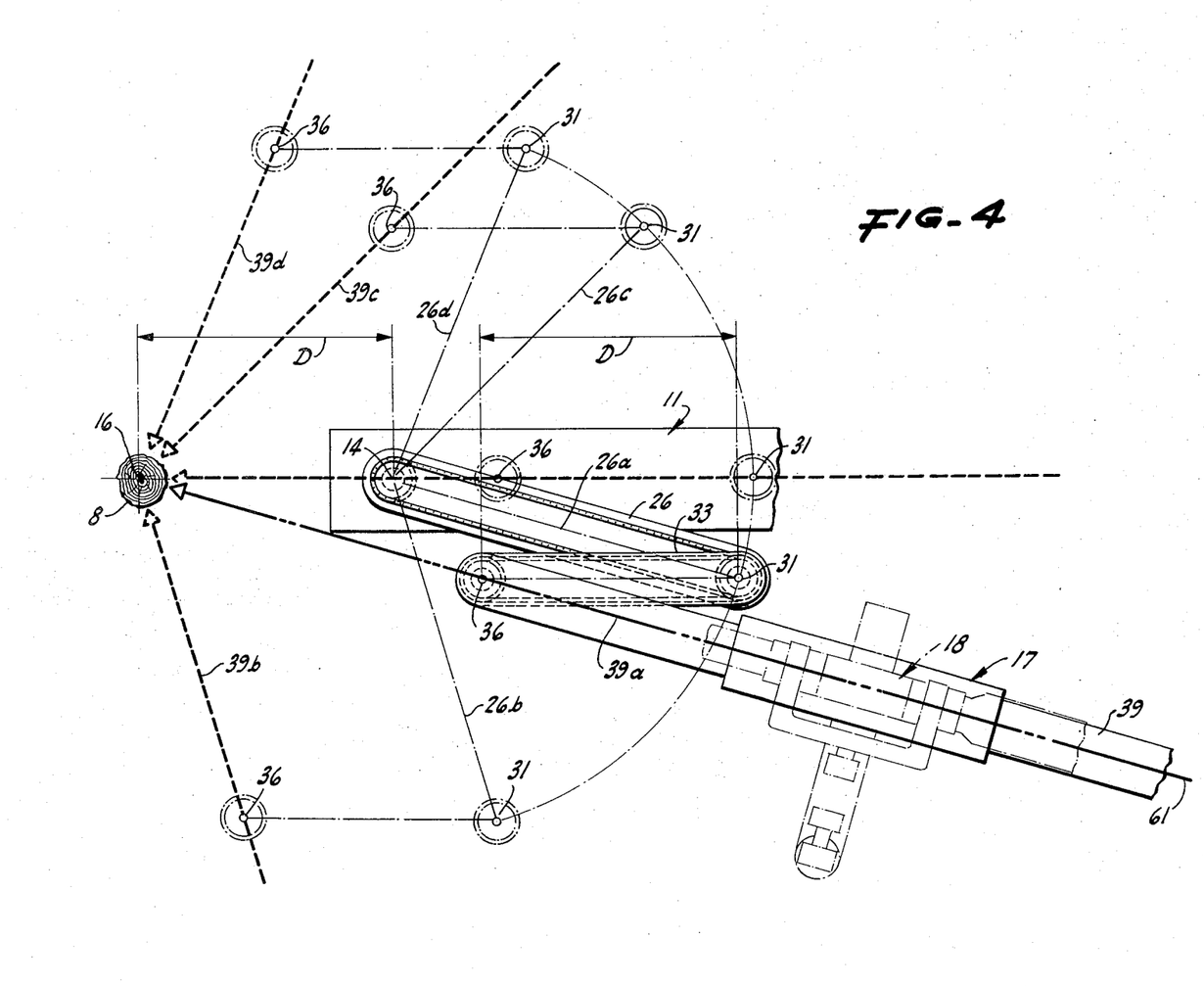
FIG. 4 is a diagram showing portions of the shaker in plan and in various orientations or locations about a tree being harvested.

Somewhat similarly, the other end of the intermediate beam 33 has a hub 34 concentric with a third axis 36 parallel to the axes 14 and 31 and journalled for rotation about a third spindle 37 concentric with the axis 36 and extending into a boss 38 at one end of a top beam 39. The connection between the spindle 37 and the boss 38 is a fixed one, for example by means of a keyed and tapered connector 41. The beam 39 is extended longitudinally and preferably is of a channel shape to afford lateral tracks 42. The platform 17 is supported on the tracks by wheels 43 confining the movement of the platform 17 to rectilinear translation along the top beam 39. The length of the top beam is extensive and the length of the base beam 26 is also made of any convenient length between the axes 14 and 31. More particularly, the length of the intermediate beam 33 between the axes 31 and 36 is made, as shown in FIG. 4, the distance D. This is the same as the optimum distance of the axis 14 from the tree axis 16 or is as nearly the same as is practical.

The linkage so far described is not completely free but is constrained so that there is always a relationship of parallelism between the top beam 39 and the base beam 26 or, stated differently, so that the intermediate beam 33 always remains parallel to itself in any effective position of the structure. The rotation of the base beam 26 and its end 24 about the axis 14 relative to the carriage 11 is established as a part or substantially all of a circle, in practice usually only about 180 degrees. This is accomplished by the provision of a sprocket 46 fast on the hub 27 secured to the beam end 24. There is a connecting chain 47 leading to any suitable sort of propelling engine, such as a hydraulic motor, either of rotary or reciprocatory. The effect is to provide under the control of the operator a power driven means for rotating the end 24 of the base beam 26 as shown particularly in FIG. 4 in which the base beam 26 can occupy, for example, the position 26a, the position 26b or the positions 26c and 26d.

The upper end of the first spindle 21 is provided with a sprocket 52 fixed thereon and engaged by a chain 53 which also engages a sprocket 54 journalled on the spindle 29 and fixed to the hub 32. Since the sprockets 52 and 54 are of the same diameter, the sprocket 54 retains the same polar orientation as does the fixed sprocket 52. In essence, the spindle 29 acts as a datum point comparable to that of the spindle 21 fixed on the carriage 11.

In a similar fashion the spindle 29 also has a sprocket 56 secured thereto and connected by a chain 57 to another equal sprocket 58 fixed to the spindle 37. The spindle 37 is fast in the top beam 39 so that the polar orientation of the top beam 39 is substantially the same always as the polar orientation of the base beam 26. The top beam 39 thus can occupy positions 39a, 39b, 39c and 39d, as shown in FIG. 4. In every instance the longitudinal axis 61 of the top beam is pointed generally at the axis 16 of the tree trunk.

An operator on the platform 17, for example, can swing in substantially a half circle around one side of the tree trunk yet always faces the trunk. This is without any steering activity on his part, except to actuate and control the motor propelling the chain 47. In practice the structure illustrated is made considerably more compact in a vertical direction and the various working parts are housed so that the operator on the platform 17 is relatively close to the carriage 11 and is protected throughout movement of the mechanism from harmful contact with any of the machinery. The described four-bar linkage, as especially illustrated in FIG. 4, is effective always to orient the operator facing the tree trunk.

At the same time the operator has an option as to his distance or radial position from the trunk. That is because he is furnished a control over the operation of the platform 17 radially along the top beam track 42. To propel the platform 17 and hold it in position anywhere along the top beam, there is provided on the platform a chain 63 trained around a sprocket 64 on the top beam and likewise engaged with a hydraulic driving mechanism such as a rotory or reciprocating motor (not shown) provided with a control convenient to the operator. By properly controlling the radial hydraulic mechanism, the operator can position the platform 17 as he likes along the beam.

The operator also has control of the height or vertical position of a rotational support 66 disposed above the platform 17. For this reason there is mounted on the platform a hydraulic plunger 67 on which a hydraulic cylinder 68 can reciprocate in a vertical direction. The cylinder 68 and the plunger 67 are free to rotate relatively about a vertical axis. The cross or horizontal axis 69 of the support 66, although varying in distance above the platform, is customarily oriented in a vertical plane more or less at right angles to the longitudinal axis 61 of the top beam. A hydraulic connection 70 joins mechanism under control of the operator for varying the amount of hydraulic fluid in the cylinder 68 above the plunger 67. This lets the operator position the axis 69 at any selected height above the platform.

A special structure is provided for mounting the shaker unit 18 on the support 66. The support 66 is preferably a shaft disposed at the upper end 71 of a frame 72 having a cross channel 73 at its lower end 74. The shaft 66 is freely rotatable about the axis 69 at the upper end of the cylinder 68. The frame cross channel 73 corresponds to the base of the torsion bar mounting fully disclosed in U.S. Pat. No. 3,545,190, above identified. The base 73 serves as a support for a torque shaft 76 at one end freely journalled in bearings 77 and 78 and at the other end completely bound in a housing 79 fixed on the frame 72. The torsion bar 76 is rotatable about an axis 81 parallel to the axis 69. In effect, the frame 72 and the attached structures form a pendulum or are pendulously hung below the axis 69.

Mounted on and fixed to the torsion bar 76 is an upstanding link 82, the lower end being coaxial with the axis 81 and the upper end being coaxial with an axis 83 parallel to the axes 81 and 69. The upper end of the link 82 has a spring member such as a rubber bushing 85 allowing slight rotation of a pin 84 securing a yoke 86 to the link 82. Clamps 87 at the yoke ends pass around and allow rotation of the outer housing 88 of the shaker unit 18. Manual tilting of the yoke 86 shifts the center of gravity of the shaker unit so that the frame 72 rocks and the axis 83 is always disposed vertically below the axis 69. Stated differently, moving the center of gravity of the structure supported on the shaft 76, particularly the shaker and its attendant parts, produces rotation about the axis 69 so that the axis 83, as especially shown in FIG. 2, always comes to rest directly below the axis 69. This mechanism is utilized generally as a slope compensator to maintain the link 82 and the axis 18a approximately perpendicular, as the shaker unit 18 is tilted with respect to the horizontal to accommodate various tree branches in the tree.

The shaker unit 18 is in most respects a standard unit, represented in the literature, with the housing 88 terminating in an operating bar 89 so that the operator can swing or rotate the shaking unit about the axes 68a, 69 and 18a. By operating appropriate controls furnished him near the operating bar 89 the operator can cause the shaker unit to rise and fall and to swing about the tree, as illustrated in FIG. 4, as well as to move to and fro radially along the tracks 42. The operator has complete control over the location of the shaker unit with respect to a tree branch 9 to be engaged.

Figure 5:
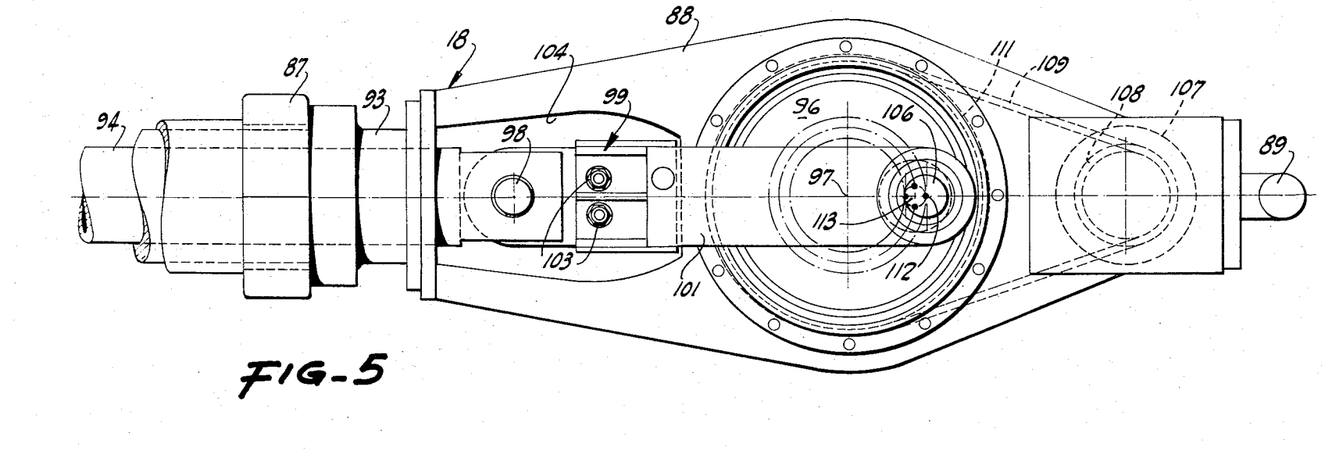
FIG. 5 is a side elevation to an enlarged scale of a portion of the shaker unit mechanism, various parts being broken away and cover structures being removed to disclose the interior construction.
Figure 6:
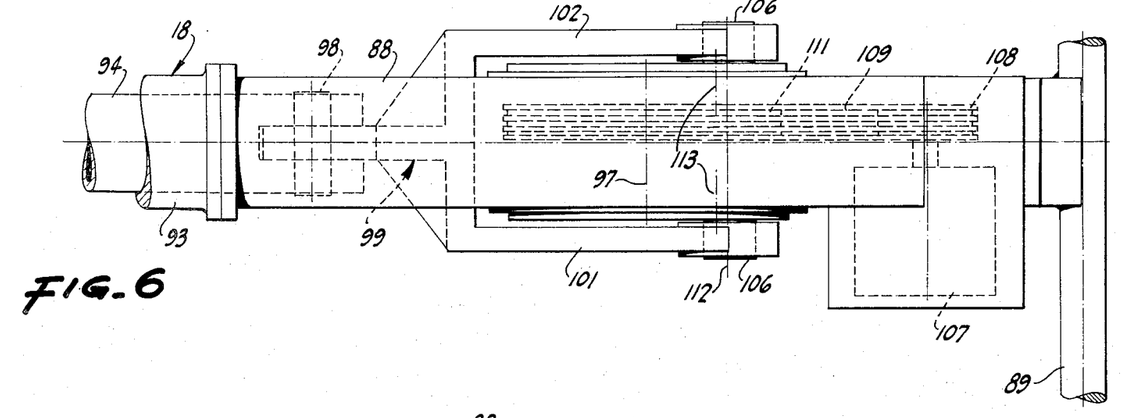
FIG. 6 is a plan of the structure shown in FIG. 5 with portions being broken away and cover housings being removed.

In the customary fashion the shaker unit 18 has padded gripping jaws 91 and 92, shown open in FIG. 1, that can be hydraulically actuated to close and grip or clamp the tree limb 9 for shaking purposes. The shaker also includes, as particularly shown in FIGS. 5 and 6, a tubular extension 93 of the housing 88 within which reciprocates a rod 94 on which the jaws 91 and 92 are mounted. When the jaws have been closed on the limb any motion of the tube 94 in a reciprocatory fashion within the housing extension 93 causes an appropriate shaking of the tree limb.

Figures 7, 8:
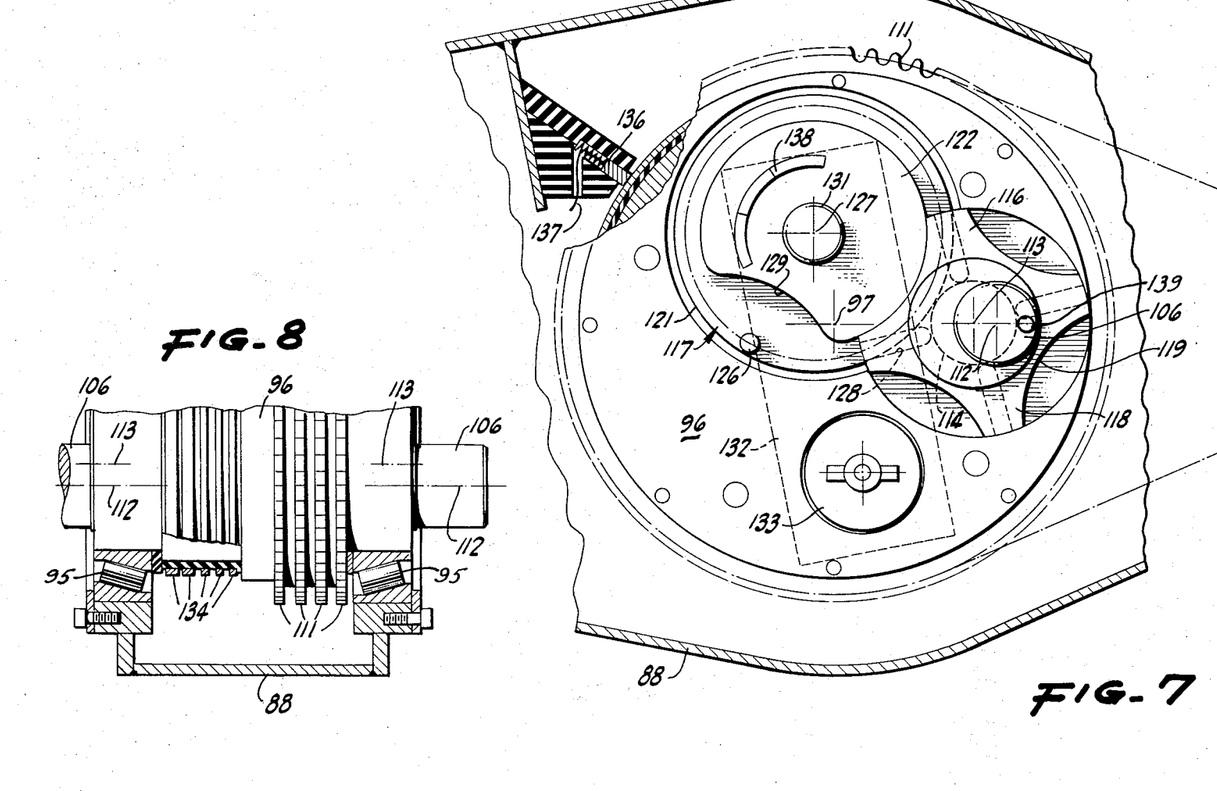
FIG. 7 is a cross-section on a longitudinal transverse plane through a part of the drive structure incorporated with the mechanism of FIGS. 5 and 6.
FIG. 8 is a fragmentary view showing in plan a portion of the structure illustrated in FIG. 7 with certain parts being shown in cross-section and other parts being broken away.

To provide the shaking motion the housing 88 encloses a rotor 96 mounted in bearings 95 (FIG. 8) in the housing for turning about an axis 97. A wrist pin 98 (FIGS. 5 and 6) at one end of the rod 94 connects to a duplex pitman 99. The pitman has a pair of substantially identical side arms 101 and 102 secured together by fastenings 103 and diverging through an opening 104 in the housing 88. The arms 101 and 102 engage the opposite ends of a transverse crank pin 106 connected to the rotor 96. Upon rotation of the rotor the pitman is operated and the rod 94 is reciprocated.

To drive the rotor 96 a hydraulic motor 107 is disposed within the housing 88 and has a sprocket group 108 joined by chains 109 to a sprocket group 111 fastened around the periphery of the rotor 96. The operator has a control for the motor 107 so that the speed of the motor can be varied in order to change the speed of rotation of the rotor 96 and thus to change the frequency of reciprocation of the shaker jaws 91 and 92. This control is preferably convenient to the operator so that at any time during the shaking operation the operator can vary the shaking frequency.

Particularly in accordance with this invention, there is also provided means under the immediate control of the operator for varying from time to time at his option the stroke of the reciprocating rod 94 within the housing extension 93. To that end the crank pin 106 has its axis 112 arranged eccentrically to the axis 113 of a shaft 114 journalled in the rotor 96. When the shaft 114 is rotated about its axis 113 it carries the eccentric crank pin 106 bodily about the axis 113 thus moving the crank pin axis 112 into different radial positions with respect to the rotational axis 97 of the rotor itself. In this fashion the radial position of the crank pin is varied and thus the stroke of the shaker motion is varied.

In order to position the crank pin as desired and to lock it into any one of several, say three, selected radial positions, there is mounted on the shaft 114 and fixed thereto a star wheel 116 that is a portion of a geneva movement also including a driving wheel 117. The star wheel 116 includes radial arms such as 118, typical of the other three arms, arranged symmetrically about the axis 113 and separated by arcuate locking surfaces 119. The locking surfaces run against the circular rim 121 of a generally circular disk 122 mounted on the driving wheel 117 and mating with the immediately adjacent, concave surface 119.

On the wheel 117 is a pin 126 rotatable with the wheel 117 about the axis of rotation 127 of that wheel and in a programmed fashion effective to enter into a one or the other of a plurality of symmetrically disposed radial slots 128 on the star wheel. The pin 126 tends to rotate the star wheel a quarter turn and accomplishes that rotation since the disk 122 has an arcuate cut out portion 129. When the driving wheel and the star wheel are properly related there is a quarter turn rotation of the star wheel for each full rotation of the driving wheel with the disk 122 locking the star wheel in position between advancements thereof.

In practice but three positions of the star wheel are needed to move the crank pin 106 between a radially outermost position to a radially intermediate position and a radially innermost position. This affords the operator a choice of three different strokes for the shaker.

The driving wheel 117 with its appurtenant parts is properly mounted on a stub shaft 131 rotatable about the axis 127 by appropriate drive mechanism and reduction gear, not shown, disposed in a housing 132 mounted within the rotor 96 and connected to an electric motor 133 also mounted in the rotor. The motor 133 has appropriate conductors extending to a plurality of slip rings 134 (see FIGS. 7 and 8) contacted by brushes 136 within the housing 88 and joined by conductors 137 to an appropriate source of energy for the motor 133 and to appropriate control switches therefor. The operator, therefore, is enabled to rotate the crank pin 106 into any one of its three selected positions by electrical means and can do so readily and without delay. Stepped cams 138 on the disk 122 actuate an electrical switch in series with position switches (not shown) actuated by a cam 139 on the pin 106 and having connectors through the slip rings 134 to indicator lights. By inspection, the operator can discern the position of the geneva movement and the set stroke for the shaker. In practice the mechanism shown is housed by cover housings to retain lubricant and to prevent dangerous exposure of the mechanism to the operator.

As an alternative and less sophisticated arrangement, the eccentric crank pin can be set into the rotor 96 and clamped in any one of several position holes satisfactory for different crop requirements. This eliminates the electric drive mechanism and the geneva movement. This, however, involves stopping the mechanism, removal of a housing cover and manual setting of the crank pin stopped. For some operations this is satisfactory but for olives it is preferred to have the more elaborate mechanism so that the shaking stroke can be varied instantly and frequently during harvest operation.

Figure 9:
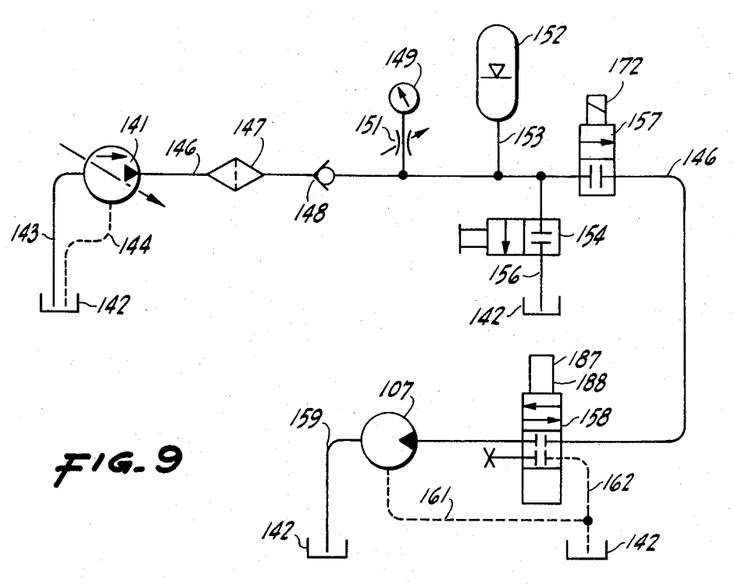
FIG. 9 is a diagram showing a hydraulic circuit utilized in connection with the tree shaker.

Part of the hydraulic circuitry for controlling some of the mechanism is especially shown in FIG. 9. To control the speed of the hydraulic motor 107 and so the frequency of the shaker there is provided a suitably driven hydraulic pump 141 deriving operating fluid from a reservoir 142 through a conduit 143 and having a drain or return line 144. The pump discharges through a pipe 146 containing a filter 147 and a check valve 148. There is a pressure gage 149 connected to the pipe 146 through a variable restricting valve 151. An accumulator 152 has a connector 153 joining the accumulator to the pipe 146. Also connected to the pipe 146 is a manually operated drain valve 154 having a line 156 leading back to the reservoir 142. In one position of the valve 154, as shown, the drain line 156 is blocked and pressure can be maintained in the pipe 146. In the other position of the valve 154, there is a direct drain connection to the reservoir and no hydraulic pressure for operation is then available.

In the pipe 146 is disposed an electrically operated valve 157. In one position this valve blocks pressure at the valve 157 while in the other position, the valve 157 allows pressurization of the entire pipe 146. In series with the valve 157 in the pipe 146 is a proportioning valve 158 leading to the hydraulic motor 107 which has a discharge line 159 leading to the reservoir 142. Drain lines 161 and 162 extend from the motor 107 and the valve 158 to the reservoir 142. The valve 158 has the property of varying the amount of hydraulic flow from the pipe 146 to the motor 107 by restricting flow and is proportionately responsive to the amount of electric actuating current supplied to the valve 158 under control of the operator.

Figure 10:
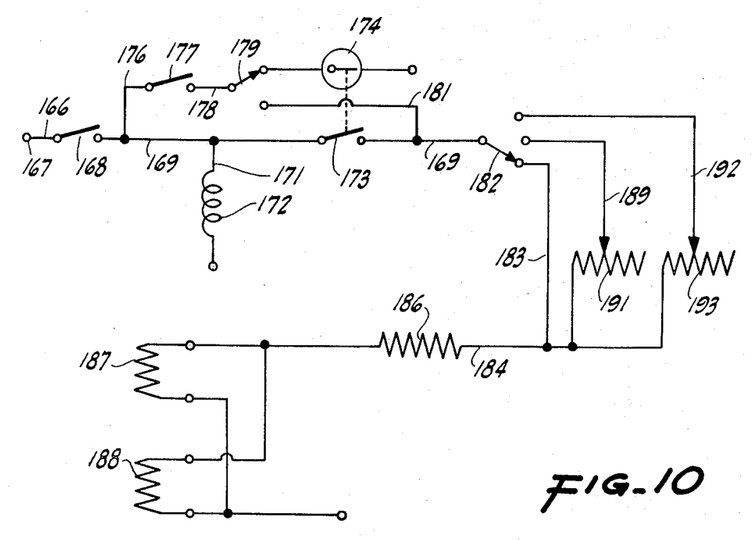
FIG. 10 is a diagram showing an electrical circuit utilized in connection with the tree shaker.

The electric control is as shown in FIG. 10. A conductor 166 extends from an electric power source 167 through a main switch 168 to a conductor 169 to which is connected a lead 171 extending to the coil 172 of the on-off valve 157 so that when the switch 168 is closed the valve 157 is opened. In the conductor 169 is a timing switch 173 under control of a timing motor 174 so that the switch 173 can be opened after a predetermined time of operation. A lead 176 from the conductor 169 extends to a manual switch 177 which itself is joined through a lead 178 to a selector switch 179. One pole of the switch 179 goes to the timing motor 174 while the other pole of the switch 179 has a conductor 181 shunting the switch 173 and joining the conductor 169. The operator thus has a choice and can use or omit the timing switch.

The conductor 169 goes to a selector switch 182 having three positions. In the position shown, the switch is connected through a lead 183 to a conductor 184 joined through a fixed resistor 186 to the operating coils 187 and 188 of the proportioning valve 158 and thence back to the power source. In another position, the switch 182 is connected through a lead 189 and a variable resistor 191 to the conductor 184 while in a final position the switch 182 is connected through a lead 192 and a variable resistor 193 to the conductor 184. The operator thus has a choice of several electric controls for correspondingly governing the hydraulic system to vary the speed of the motor 107 and thus the frequency of operation of the shaker unit. The valve 157 and main switch 168, although not essential, are included as safety features to avoid accidental operation of the shaker motor. Both switches 168 and 177 must be actuated to activate the motor 107.

What is claimed is:

1. A tree shaker comprising a carriage adapted to be disposed adjacent a tree trunk, a shaker unit platform extending along a center line, a shaker unit having a longitudinal axis, means for supporting said shaker unit on said platform, and means for mounting said platform on said carriage for movement relative thereto and for constraining said platform to move relative to said carriage in an arcuate path approximately centered on said trunk and with the center line of said platform in every position of said platform in said path intersecting at a common point and being always directed toward said trunk.

2. A device as in claim 1 in which said mounting means is a four-bar linkage.

3. A device as in claim 1 in which said mounting means includes a base beam, first means for pivoting one end of said base beam on said carriage, an intermediate beam, second means for pivoting one end of said intermediate beam to the other end of said base beam, a top beam, third means for pivoting one end of said top beam to the other end of said intermediate beam, means for mounting said platform on said top beam, and means for holding said top beam parallel to said base beam in various pivoted positions of said base beam on said carriage.

4. A device as in claim 3 including a first spindle secured to said carriage and extending coaxially with said first pivoting means, a first sprocket fixed on said first spindle, a second spindle extending coaxially with said second pivoting means, a second sprocket journalled on said second spindle and fixed to said one end of said intermediate beam, a third sprocket fixed on said second spindle, a third spindle extending coaxially with said third pivoting means and secured to said top beam, a third sprocket fixed on said second spindle, a fourth sprocket fixed on said third spindle, a first chain engaging said first sprocket and said second sprocket, and a second chain engaging said third sprocket and said fourth sprocket.

5. A device as in claim 3 including means for pivotally moving said base beam on said carriage.

6. A device as in claim 3 in which said means for mounting said platform on said top beam includes means for constraining said platform and said top beam to relative rectilinear translation.

7. A device as in claim 6 including means for translating said platform on said top beam.

8. A device as in claim 1 including means on said platform establishing a support for rotation about a first horizontal axis, a frame having an upper portion and a lower portion, means for connecting said upper portion of said frame to said support for motion about said first horizontal axis, a link, means for connecting one end of said link to said lower portion of said frame for pivotal motion about a second horizontal axis parallel to said first horizontal axis, means for connecting said shaker unit to the other end of said link for pivotal motion about a third horizontal axis parallel to said first horizontal axis, and a spring connected to said frame and to said link for restraining relative pivotal motion between said frame and said link about said second horizontal axis.

9. A device as in claim 8 in which said spring is a torsion bar.

10. A device as in claim 8 in which said means for connecting said shaker unit to the other end of said link includes a spring for limiting said pivotal motion.

11. A device as in claim 10 in which said spring is a rubber bushing.

12. A device as in claim 8 including means for changing the distance between said first horizontal axis and said platform.

* * * * *